(12) United States Patent
Miyazaki et al.

(10) Patent No.: US 9,397,364 B2
(45) Date of Patent: Jul. 19, 2016

(54) ELECTRIC STORAGE DEVICE AND ELECTRIC STORAGE APPARATUS

(71) Applicant: GS Yuasa International Ltd., Kyoto-shi (JP)

(72) Inventors: Akihiko Miyazaki, Kyoto (JP); Sumio Mori, Kyoto (JP); Tomonori Kako, Kyoto (JP); Kenta Nakai, Kyoto (JP)

(73) Assignee: GS YUASA INTERNATIONAL LTD., Kyoto-shi, Kyoto (JP)

( * ) Notice: Subject to any disclaimer, the term of this patent is extended or adjusted under 35 U.S.C. 154(b) by 0 days.

(21) Appl. No.: 14/503,657

(22) Filed: Oct. 1, 2014

(65) Prior Publication Data

US 2015/0093620 A1    Apr. 2, 2015

(30) Foreign Application Priority Data

Oct. 1, 2013 (JP) .................................. 2013-206086
Aug. 28, 2014 (JP) .................................. 2014-173813

(51) Int. Cl.
*H01M 10/04* (2006.01)
*H01M 2/02* (2006.01)
*H01M 2/18* (2006.01)

(52) U.S. Cl.
CPC ............ *H01M 10/0431* (2013.01); *H01M 2/02* (2013.01); *H01M 2/0202* (2013.01); *H01M 2/0217* (2013.01); *H01M 2/0237* (2013.01); *H01M 2/0277* (2013.01); *H01M 2/18* (2013.01)

(58) Field of Classification Search
CPC . H01M 10/0431; H01M 2/02; H01M 2/0202; H01M 2/0237
See application file for complete search history.

(56) References Cited

U.S. PATENT DOCUMENTS

| 8,697,272 | B2 | 4/2014 | Lee |
| 8,703,316 | B2 | 4/2014 | Motohashi |
| 2006/0051666 | A1 | 3/2006 | Kim |
| 2010/0227215 | A1* | 9/2010 | Cheon et al. ................... 429/178 |
| 2011/0052975 | A1* | 3/2011 | Lee ...................... H01M 2/0237 429/178 |
| 2011/0171522 | A1* | 7/2011 | Park et al. ....................... 429/176 |
| 2012/0208069 | A1* | 8/2012 | Kim ............................... 429/153 |
| 2012/0301759 | A1* | 11/2012 | Yoshitake et al. ............... 429/94 |

FOREIGN PATENT DOCUMENTS

| JP | 62-126566 A | 6/1987 |
| JP | 2005-285557 A | 10/2005 |
| JP | 2005-346965 A | 12/2005 |
| JP | 2006-40879 A | 2/2006 |
| JP | 2011-54567 A | 3/2011 |
| JP | 2011-60624 A | 3/2011 |
| JP | 2011-151018 A | 8/2011 |
| JP | 2011-216239 A | 10/2011 |
| JP | 2012-248462 A | 12/2012 |

* cited by examiner

*Primary Examiner* — Muhammad Siddiquee
(74) *Attorney, Agent, or Firm* — McGinn IP Law Group

(57) ABSTRACT

An electric storage device includes: an electrode assembly in which electrodes are wound such that paired curved portions and a straight portion connecting the paired curved portions are formed; a case which houses the electrode assembly, the case comprising a convex part protruding toward the straight portion of the electrode assembly to support the straight portion; and a support portion which supports the curved portion toward an inside of the electrode assembly.

14 Claims, 10 Drawing Sheets

Related Art

ELECTRIC STORAGE DEVICE AND ELECTRIC STORAGE APPARATUS

CROSS-REFERENCE TO RELATED APPLICATIONS

This application claims the benefit of Japanese patent applications No. 2013-206086, filed on Oct. 1, 2013, and No. 2014-173813, filed on Aug. 28, 2014, which are incorporated by reference.

FIELD

The present invention relates to an electric storage device which can be charged and discharged.

BACKGROUND

Conventionally, there is a known electric storage device such as a secondary battery which can be charged and discharged. The electric storage device includes an electrode assembly formed by layering positive electrodes and negative electrodes with separators interposed therebetween and a case housing the electrode assembly. Among electric storage devices of this type, as shown in FIG. 8, there is one in which a case 101 has a substantially rectangular parallelepiped external shape capable of housing an electrode assembly 102 inside itself and paired side walls 101a, 101a forming the case 101 have a plurality of convex parts 104, 104, ... protruding toward an inside of the case 101 (JP-A-62-126566).

In such an electric storage device 100, the convex parts 104 press substantially the entire electrode assembly 102 toward an inner side in a layered direction at predetermined pressure to narrow intervals between the adjacent electrodes 103 in substantially the entire electrode assembly 102. As a result, charge-discharge efficiency of the electric storage device 100 is enhanced.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention to provide an electric storage device including an electrode assembly which is formed by winding electrodes and in which partial clearances are less liable to be formed between the adjacent electrodes.

An electric storage device according to an aspect of the invention includes: an electrode assembly in which electrodes are wound such that paired curved portions and a straight portion connecting the paired curved portions are formed; a case which houses the electrode assembly, the case comprising a convex part protruding toward the straight portion of the electrode assembly to support the straight portion; and a support portion which supports the curved portion toward an inside of the electrode assembly.

BRIEF DESCRIPTION OF THE DRAWINGS

The foregoing and other features of the present invention will become apparent from the following description and drawings of an illustrative embodiment of the invention in which.

DESCRIPTION OF EMBODIMENTS

Figure 9:
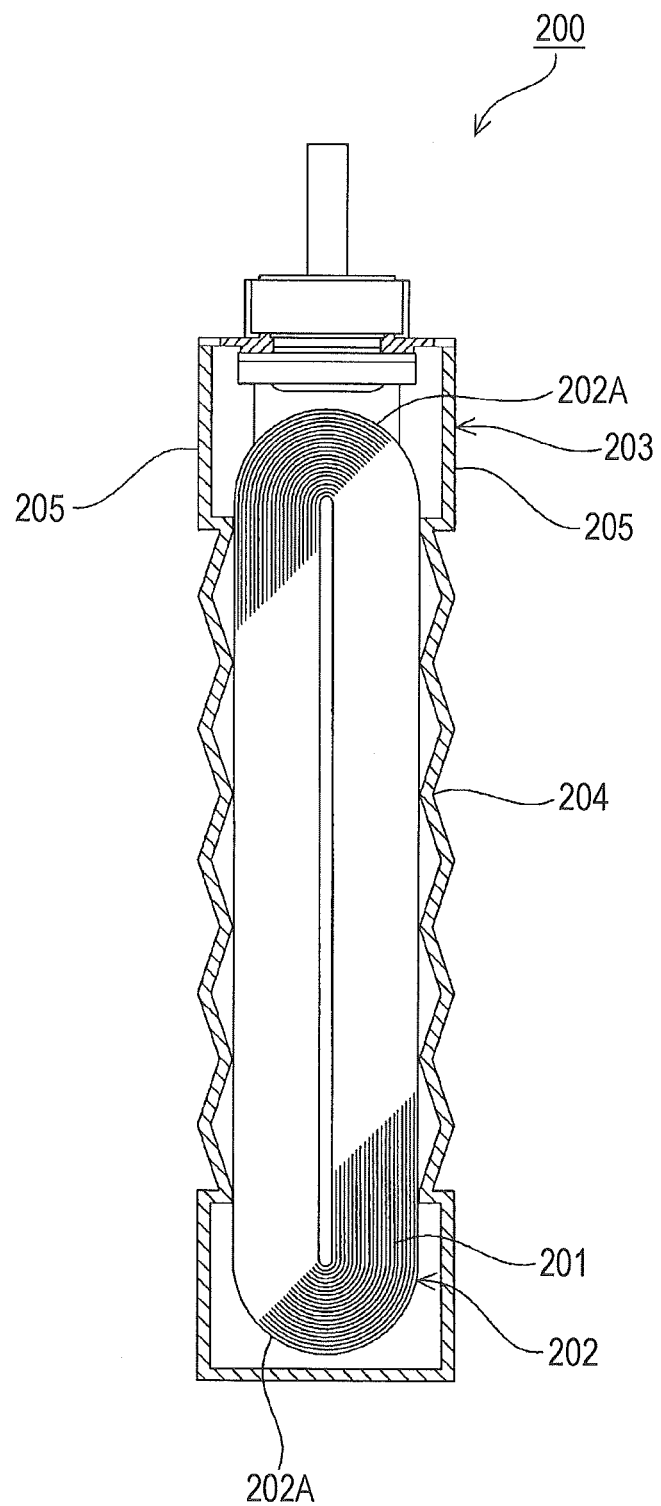
FIG. 9 is a vertical sectional view of an electric storage device according to a comparative example.

An electric storage device 200 shown in FIG. 9 includes an electrode assembly 202 formed by winding band-shaped electrodes 201, the electrode assembly 202 being housed in a case 203. The band-shaped electrodes 201 are wound such that a section orthogonal to a winding axis has an elliptic shape. The case 203 has paired side walls 205, 205 which are parallel to a major axis direction (a vertical direction in FIG. 9) of the electrode assembly 202 and which respectively have convex parts 204 protruding toward the electrode assembly 202. The convex parts 204 pinch the electrode assembly 202 in a minor axis direction (a left-right direction in FIG. 9) so as to narrow intervals between the adjacent electrodes 201 in the wound electrode assembly 202.

In this electric storage device 200, if expansion and contraction of the electrode assembly 202 is repeated due to repetition of charge-discharge or the like, displacements of the electrodes 201 gather in curved portions (which are end portions of the electrode assembly 202 in the major axis direction and also are curved portions of the electrodes 201) 202A not pressed by the convex parts 204. Then, partial clearances and the like are formed between the electrodes 201 layered in the curved portions 202A. If the partial clearances are formed between the electrodes 201 forming the electrode assembly 202 in this manner, charge-discharge efficiency is reduced.

An electric storage device according to an aspect of the invention includes: an electrode assembly in which electrodes are wound such that paired curved portions and a straight portion connecting the paired curved portions are formed; a case which houses the electrode assembly, the case comprising a convex part protruding toward the straight portion of the electrode assembly to support the straight portion; and a support portion which supports the curved portion toward an inside of the electrode assembly.

With this structure, in the case, the straight portion is supported by the convex part and also the curved portion is supported by the support portion toward the inside of the electrode assembly. Therefore, it is possible to suppress gathering of displacement of the electrodes in the curved portion, the gathering caused by repetition of expansion and contraction of the electrode assembly during charge-discharge, or the like. In this way, it is possible to prevent forming of partial clearances between the electrodes layered at the curved portions of the electrode assembly. Here, the curved portions of the electrode assembly refer to portions of which peripheral faces are curved, and the straight portion of the electrode assembly refers to a portion of which peripheral face is substantially straight.

The support portion may support at least one of the paired curved portions of the electrode assembly.

With this structure, it is possible to prevent forming of the partial clearances between the electrodes layered at least at one of the paired curved portions. In this way, as compared with a structure in which only a straight portion of an electrode assembly is supported, the intervals between the electrodes forming the electrode assembly become narrow, which increases charge-discharge efficiency.

The case may have a substantially rectangular frame-shaped section and house the electrode assembly such that a side of the substantially rectangular frame-shaped section extends along the straight portion, the support portion may be disposed in a corner portion of the substantially rectangular frame-shaped section in the case.

In this manner, because the support portion is disposed in the corner portion of the substantially rectangular frame-shaped section in the case, the support portion is supported by the case from two directions. In this way, the support portion can effectively support the curved portion of the electrode assembly toward inside. As a result, it is possible to more reliably prevent forming of the partial clearances between the electrodes layered in the curved portion.

The support portion may be disposed while being elastically deformed between the case and the curved portion of the electrode assembly.

In this manner, the curved portion of the electrode assembly is supported by utilizing resilience generated by the elastic deformation of the support portion. Therefore, even if the electrode assembly expands and contracts due to the charge-discharge or the like, i.e., changes in size (winding diameter), the support portion can follow the change in size and continue to support the curved portion.

The electric storage device may include an insulating member disposed between the case and the electrode assembly to insulate the case and the electrode assembly from each other, wherein the support portion may be a part of the insulating member.

With this structure, the support portion is formed by using the part of the insulating member for insulating the case and the electrode assembly from each other, and therefore it is possible to reduce the number of parts forming the electric storage device as compared with a case in which a member forming the support portion is disposed separately.

The insulating member may have a portion curved to bulge toward the electrode assembly, and the curved portion of the insulating member may support the curved portion of the electrode assembly.

In this manner, with the simple structure in which the part of the insulating member is curved to bulge toward the electrode assembly, it is possible to form the support portion for supporting the curved portion toward the inside of the electrode assembly.

A dimension of the support portion in a direction orthogonal to a winding direction of the electrodes is preferably substantially equal to or greater than a dimension of the electrode assembly in the direction orthogonal to the winding direction.

With this structure, substantially the entire curved portion in the direction orthogonal to the winding direction of the electrodes is supported at the curved portion, and therefore it is possible to effectively prevent forming of the partial clearances between the layered electrodes at substantially the entire curved portion in the direction orthogonal to the winding direction.

Preferably, the case may have a plurality of the convex parts.

With this structure, because the straight portion of the straight portion is supported by plural convex parts, it is possible to effectively prevent forming of the partial clearances between the layered electrodes at the straight portion due to the charge-discharge.

The case may have a wall portion having a wave-shaped inner surface and a wave-shaped outer surface and having a substantially constant thickness, and the wave-shaped inner surface forms a plurality of the convex parts, and the plurality of convex parts support the straight portion of the electrode assembly at intervals.

With this structure, the straight portion of the electrode assembly is supported by the plurality of convex parts, and therefore it is possible to more effectively suppress forming of the clearances between the electrodes in the straight portion due to the charge-discharge. Furthermore, by providing the plurality of convex parts, rigidity of the case increases.

In the above-described structure, preferably, the case has a substantially-rectangular bottom wall portion when viewed in a direction of a normal, the wall portion has paired wall portions extending substantially vertically from paired long sides of the bottom wall portion, and a maximum clearance between the paired wall portions is greater than a dimension in a short-side direction of the bottom wall portion.

With this structure, when the plurality of electric storage devices are arranged with the straight portions being opposed and bound by a restraining member, the convex parts are pressed by the adjacent battery or the restraining member, and therefore the convex parts can reliably support the straight portion.

According to another aspect of the invention, there is provided an electric storage apparatus including the electric storage device and a restraining member.

According to the aspects of the invention, it is possible to provide the electric storage device including the electrode assembly which is formed by winding the electrodes and in which partial clearances are less liable to be formed between the adjacent electrodes, and the electric storage apparatus including the electric storage device.

An embodiment of the invention will be described below with reference to FIGS. 1 to 3. An electric storage device according to the embodiment is a nonaqueous electrolyte secondary battery (hereafter, merely referred to as "battery") such as a lithium ion secondary battery.

Figure 1:
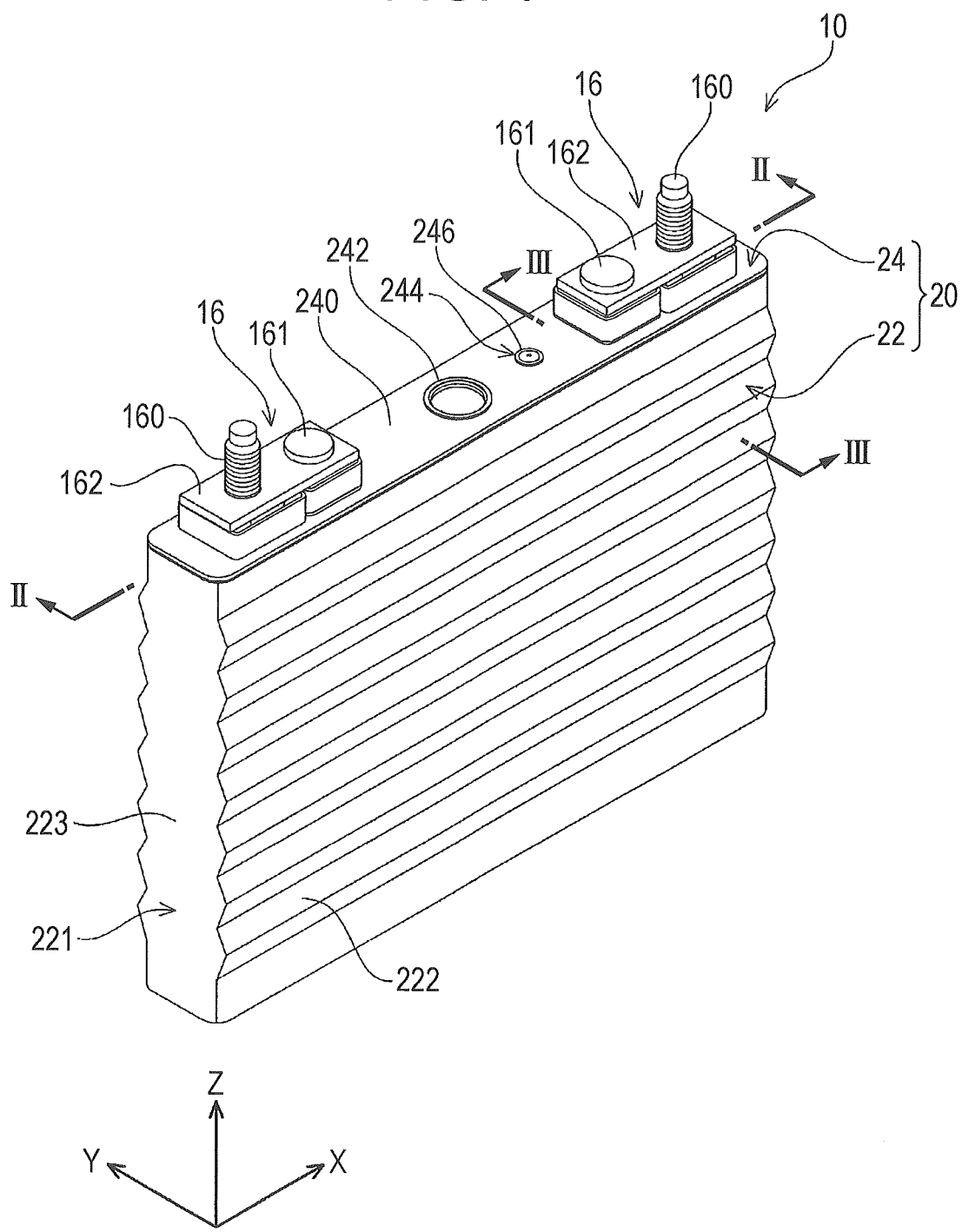
FIG. 1 is a perspective view of a non-aqueous electrolyte secondary battery according to a present embodiment.
Figure 2:
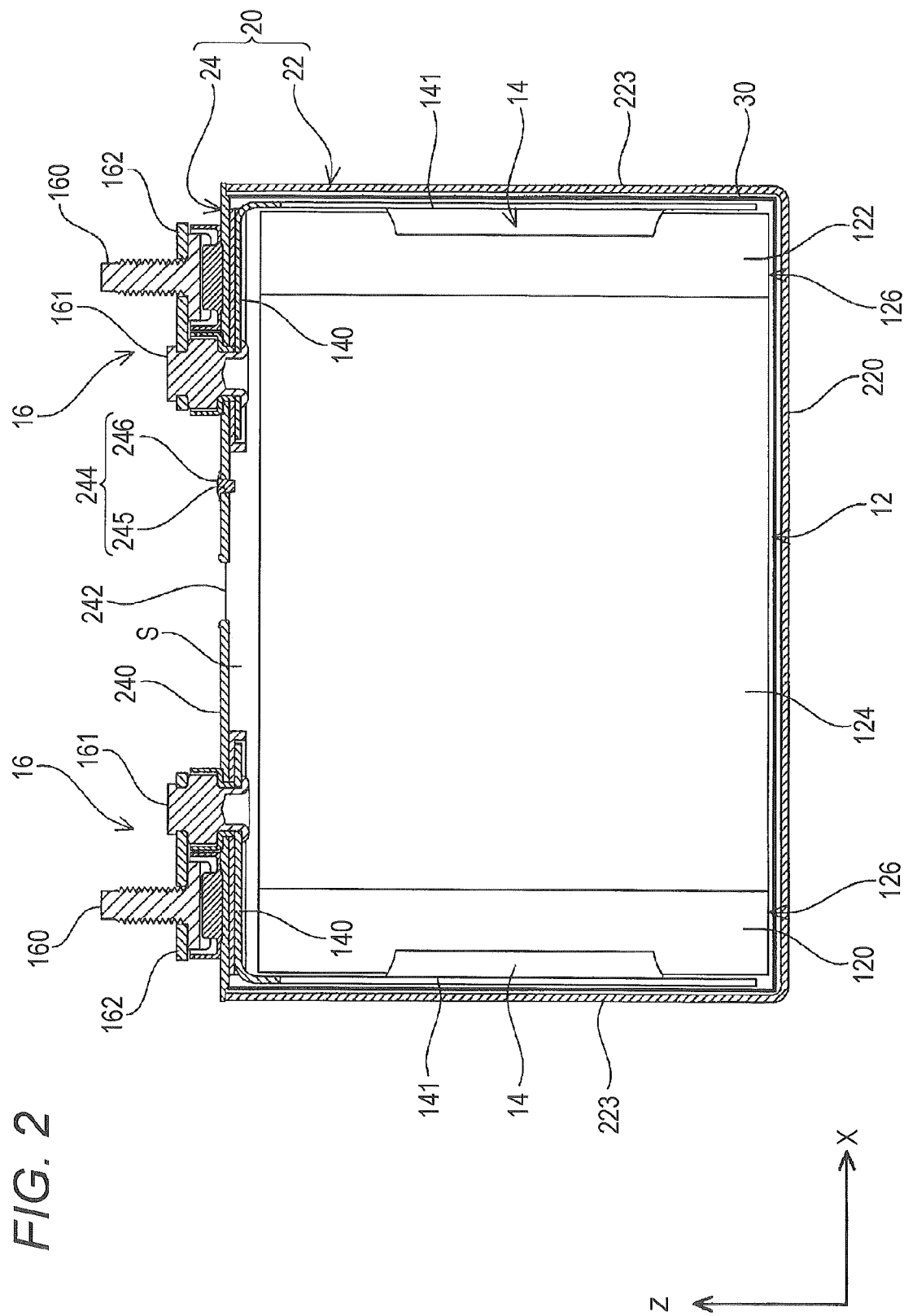
FIG. 2 is a sectional view along a line II-II in FIG. 1.
Figure 3:
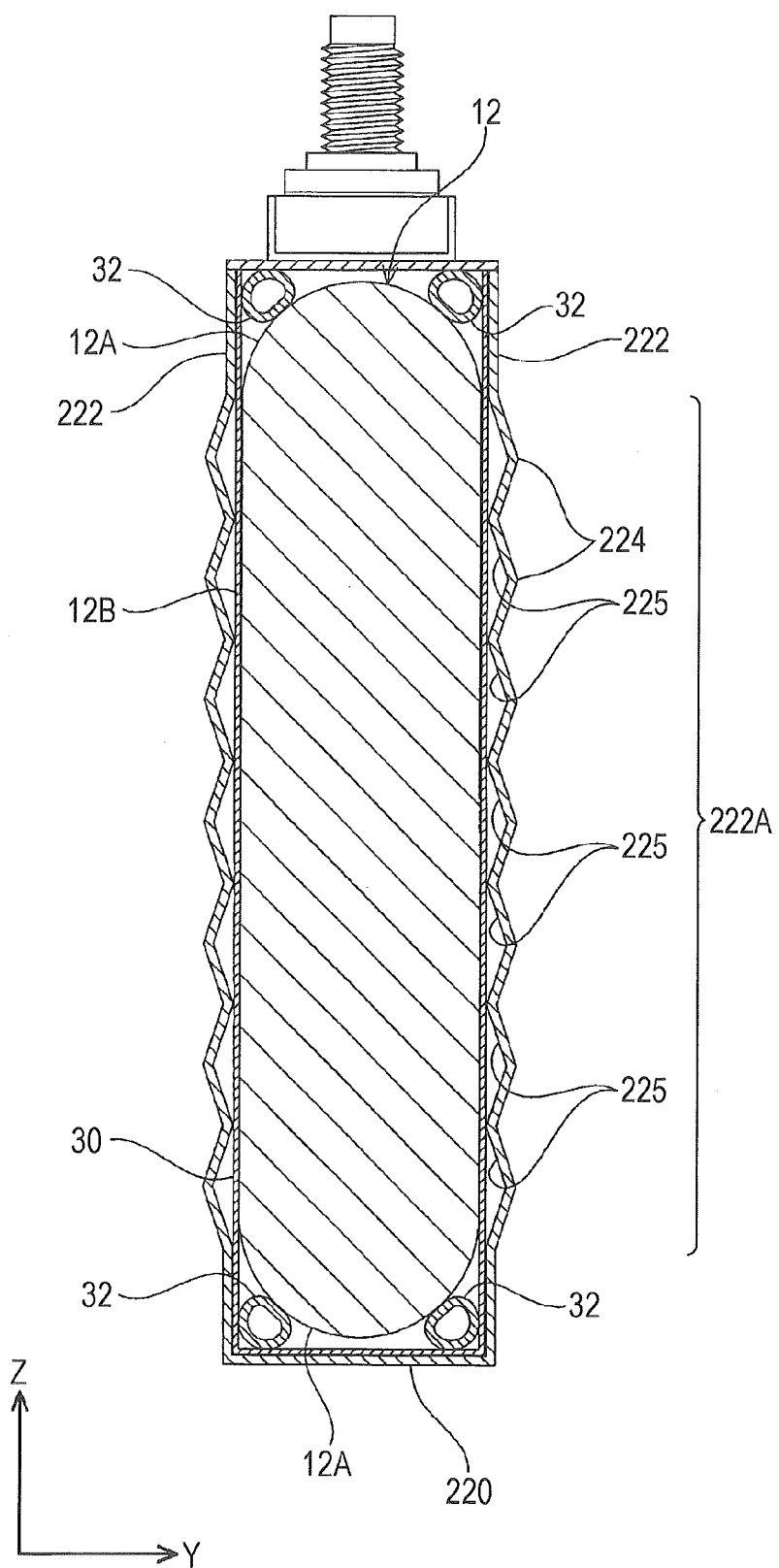
FIG. 3 is an enlarged sectional view along a line III-III in FIG. 1.

As shown in FIGS. 1 to 3, a battery 10 includes a case 20, an electrode assembly 12, paired current collectors 14, 14, an insulating member 30, support members (support portions) 32, and paired terminal portions 16, 16. In the battery 10, the winding-type electrode assembly 12 is housed in the case 20, a section of the electrode assembly 12 orthogonal to a winding axis having an elliptic shape.

The case 20 includes a case main body 22 and a lid body 24. The case 20 houses, in an inner space S surrounded with the case main body 22 and the lid body 24, the electrode assembly 12, the paired current collectors 14, 14, electrolyte solution, and the like. The case main body 22 and the lid body 24 are made of aluminum or aluminum-based metal material such as an aluminum alloy, for example. By welding end portions of the case main body 22 and the lid body 24 to each other, the case 20 is formed.

The case main body 22 has a flat rectangular cylindrical shape having a bottom. Specifically, the case main body 22 has a bottom wall portion 220 and a rectangular cylindrical peripheral wall 221 rising from a peripheral edge of the bottom wall portion 220 in a direction of a normal to the bottom wall portion 220. The bottom wall portion 220 is in a rectangular shape long in one direction and having four arc-shaped corners when viewed in the direction of the normal to the bottom wall portion 220. The peripheral wall 221 has paired long wall portions 222, 222 rising from long side positions of the peripheral edge of the bottom wall portion 220 and paired short wall portions 223, 223 rising from short-side positions of the peripheral edge of the bottom wall portion 220. In the following description, a long-side direction of the bottom wall portion 220 will be referred to as an X-axis direction, a short-side direction of the bottom wall portion 220 will be referred to as a Y-axis direction, and the direction of the normal to the bottom wall portion 220 will be referred to as a Z-axis direction (see FIG. 1).

Each of the long wall portions 222 has the plurality of convex parts 225, 225, . . . protruding toward an inner side of the case 20. To put it concretely, the long wall portion 222 has a triangular wave-shaped portion 222A which repeatedly bends alternately toward an inside and an outside of the case 20 at a position corresponding to a straight portion 12B of the electrode assembly 12 in a section along the Y-Z plane. At the triangular wave-shaped portion 222A, angle portions protruding from portions 224 positioned on an outermost side of the case 20 toward the inner side (toward the electrode assembly) form the convex parts 225.

Figure 10:
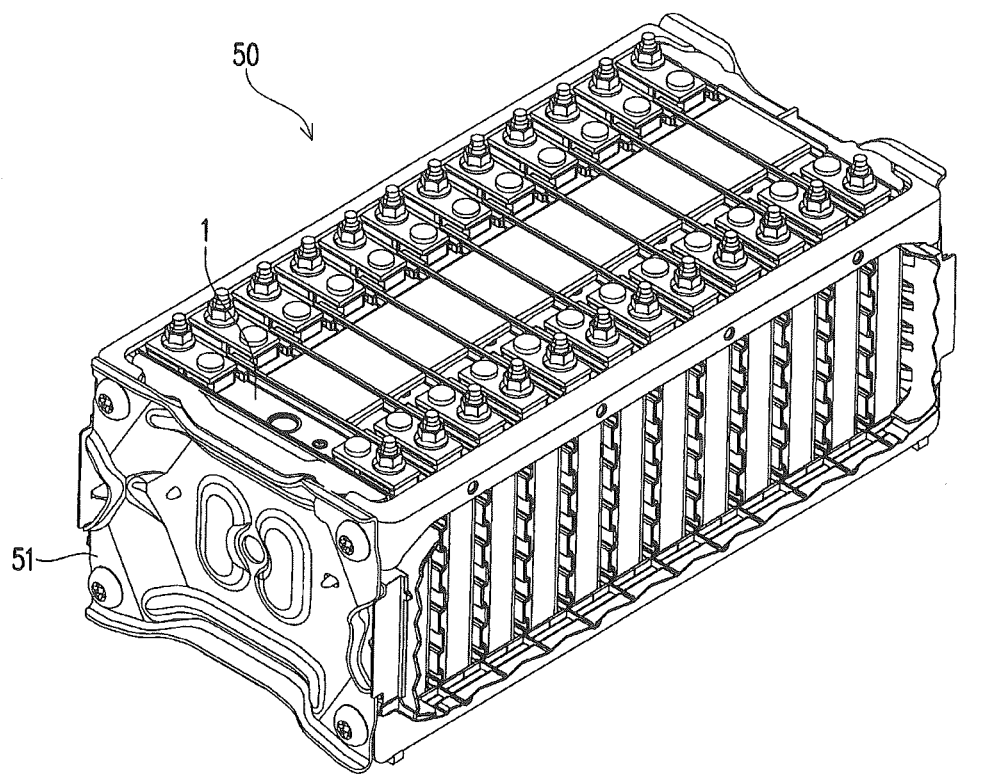
FIG. 10 is a perspective view of an electric storage apparatus.
Figure 10:
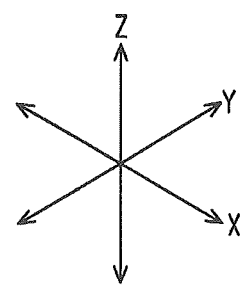

As shown in FIG. 3, in the embodiment, the portions 224 of the triangular wave-shaped portions 222A positioned on the outermost sides of the case 20 are positioned on outer sides in the Y-axis direction than end portions in the Y-axis direction of the bottom wall portion 220. In other words, a longest interval between the paired long wall portions 222 is longer than a dimension in a short-side direction of the bottom wall portion 220. Therefore, if a plurality of batteries are arranged with the long wall portions 222 being opposed and bound by a restraining member (if the plurality of batteries are pressed in a direction orthogonal to the long wall portions 222 (see FIG. 10)), the portions 224 are pressed by the adjacent batteries or the restraining member and, as a result, the convex parts 225 reliably support (or press) the straight portion 12B of the electrode assembly 12.

In the embodiment, dimensions in the Z-axis direction of the triangular wave-shaped portions 222A are substantially equal to a dimension in the Z-axis direction of the straight portion of the electrode assembly 12.

In the paired long wall portions 222, 222 arranged parallel to each other, the respective convex parts 225 are arranged to protrude in a direction approaching each other at opposed positions in the Z-axis direction. In this way, the respective convex parts 225 protrude toward the straight portion 12B of the electrode assembly 12 to support the straight portion 12B inward in a minor axis direction of the electrode assembly 12. In other words, the opposing paired convex parts 225, 225 make up a set, the plurality of sets of convex parts 225 are arranged in the Z-axis direction, and each of the sets pinches the straight portion 12B (electrode assembly 12) in the minor axis direction of the electrode assembly 12.

In the specification, the sentence, "the convex parts 225 support the straight portion 12B of the electrode assembly 12" includes a case in which the convex parts 225 are directly or indirectly in contact with the straight portion 12B of the electrode assembly 12 when the section of the single battery shown in FIG. 3 is observed with a CT scan using X-rays. The sentence, "the convex parts 225 support the straight portion 12B of the electrode assembly 12" includes a case in which the convex parts 225 are directly or indirectly in contact with the straight portion 12B of the electrode assembly 12 when the sections of the batteries are observed with the CT scan using X-rays in a state in which the plurality of batteries are arranged with the long wall portions 222 being opposed and bound by the restraining member (the state in which the plurality of batteries are pressed in the direction orthogonal to the long wall portions 222).

The convex parts 225 of the singe battery may be away from the straight portion 12B of the electrode assembly 12 when the long wall portions 222 are not pressed. Such a battery is preferable, because it is relatively easy to form the convex parts 225 on the case main assembly 22.

Each of the convex parts 225 extends continuously substantially throughout the entire X-axis direction of the long wall portion 222. In other words, a dimension in the X-axis direction of the convex part 225 is substantially the same as a dimension in the X-axis direction of the electrode assembly 12 housed in the case 20.

The short wall portions 223 connect the end portions of the paired long wall portions 222, 222 arranged parallel to each other at an interval in the Y-axis direction. In this way, the paired long wall portions 222, 222 and the paired short wall portions 223, 223 form the rectangular cylindrical peripheral wall 221.

The lid body 24 is placed on an opening peripheral edge portion of the case main body 22 to close an opening of the case main body 22. The lid body 24 has a shape conforming to an outer peripheral edge (outline) of the case main body 22 in a plan view. In other words, the lid body 24 is a rectangular plate material long in the X-axis direction and having four arc-shaped corners in the plan view.

Moreover, the lid body 24 is provided with paired terminal through holes 240, 240, a gas release vent 242, and a filling portion 244 (see FIG. 2). The paired terminal through holes 240, 240 are formed at an interval in the X-axis direction in the lid body 24. The gas release vent 242 has a thin-walled portion and is formed at a center of the lid body 24. The thin-walled portion in the embodiment is in a Y shape. The gas release vent 242 releases gas in the case 20 by tearing the thin-walled portion to connect the inside and the outside of the case 20 when internal pressure (gas pressure) in the case 20 exceeds a predetermined value. In this way, the gas release vent 242 reduces the increased internal pressure of the case 20. The filling portion 244 has an electrolyte solution filling hole 245 formed in the lid body 24 and a plug body 246 for closing the electrolyte solution filling hole 245. The electrolyte solution filling hole 245 is an opening through which the electrolyte solution is filled into the case 20. The plug body 246 is fitted into the electrolyte solution filling hole 245 after the filling to thereby close the electrolyte solution filling hole 245.

The electrode assembly 12 has a band-shaped positive electrode (electrode as a positive electrode) 120, a band-shaped negative electrode (electrode as a negative electrode) 122, and band-shaped separators 124. The positive electrode 120 and the negative electrode 122 are wound into an elliptic cylindrical shape with separators 124 interposed therebetween and while displaced from each other in a width direction (a direction orthogonal to a longitudinal direction of the band-shaped electrodes, i.e., the X-axis direction in FIG. 1) to thereby form the electrode assembly 12 (see FIG. 2). The elliptic cylindrical shaped electrode assembly 12 has an elliptic sectional shape (an outline of the section) along the Y-Z plane.

In the following description, the end portions in the Z-axis of the electrode assembly 12 (the elliptic shaped section)

which are curved portions on the peripheral face of the electrode assembly 12 (i.e., the portions where the positive electrode 120 and the negative electrode 122 are alternately layered while being curved with the separators interposed therebetween) will be referred to as curved portions 12A. The portion of the electrode assembly 12 positioned between the curved portions 12A, which is a substantially straight portion on a peripheral face of the electrode assembly 12 (i.e., the portion where the positive electrode 120 and the negative electrode 122 are alternately layered in substantially straight states with the separators interposed therebetween), will be referred to as the straight portion 12B. The diameter in the Z-axis direction of the elliptic shape will be referred to as the major axis and the diameter in the Y-axis direction of the elliptic shape will be referred to as the minor axis.

The positive electrode 120 is formed by a band-shaped sheet of aluminum film supporting a positive active material on its surface, for example. The negative electrode 122 is formed by a band-shaped sheet of copper film supporting a negative active material on its surface, for example. Each of the positive electrode 120 and the negative electrode 122 has a portion not coated with the active material at an end edge portion in the width direction (X-axis direction). As a result, at end portions in the width direction (X-axis direction) of the electrode assembly 12, aluminum film and copper film not coated with the active materials are exposed. In this manner, the electrode assembly 12 has a positive-side protruding part (a positive electrode of the electrode assembly) 126 formed by only the positive electrode 120 (the portion not coated with the positive active material) protruding at one end portion in the width direction (X-axis direction) of the electrode assembly 12 and a negative-side protruding part (a negative electrode of the electrode assembly) 126 formed by only the negative electrode 122 (the portion not coated with the negative active material) protruding at the other end portion in the width direction (X-axis direction).

The electrode assembly 12 formed as described above is housed into a bag-shaped insulating member 30 (described later) and then housed into the case 20 so that one side of a substantially rectangular frame-shaped section of the case 20 (e.g., a section of the long wall portion 222 extending in the substantially vertical direction in FIG. 3) and the straight portion 12B of the electrode assembly 12 are positioned along each other. Specifically, the electrode assembly 12 is housed in the case 20 in such an attitude that a direction of the winding axis corresponds to the longitudinal direction (X-axis direction) of the case 20 and that the major axis direction corresponds to the direction of the normal to the bottom wall portion (Z-axis direction).

The insulating member 30 is formed into the bag shape having an open upper portion (upper end in the Z-axis direction) by bending a sheet-shaped member cut into a predetermined shape and having an insulation property. The insulating member 30 is disposed between the case 20 (specifically, the case main body 22) and the electrode assembly 12. In other words, the electrode assembly 12 is put into the insulating member 30 and then housed into the case 20. The insulating member 30 insulates the case 20 and the electrode assembly 12 from each other. The insulating member 30 in the embodiment is made of polypropylene, polyphenylene sulfide, or the like, for example.

The support members 32 are disposed in corner portions of the section along the Y-Z plane of the case 20 (the substantially rectangular frame-shaped section (see FIG. 3)) to support (or press) the curved portions 12A toward the inside of the electrode assembly (radially inwardly). In this manner, because the support members 32 are disposed in the corner portions of the section in the case 20, the support members 32 are supported by the case 20 from two directions (e.g., the lower left support member 32 in FIG. 3 is supported by the bottom wall portion 220 and the long wall portion 222). In this way, the support members 32 can effectively support the curved portions 12A of the electrode assembly 12 toward inside. The support members 32 are disposed in the respective four corner portions in the case 20. Each of the support members 32 in the embodiment is a cylindrical member made of resin such as polypropylene and has substantially the same length as a length of the electrode assembly 12 in the X-axis direction. The support members 32 are disposed while being elastically deformed (concretely, while being pressed by the curved portions 12A toward inner peripheral faces of the corner portions of the case 20) between the insulating member 30 disposed along an inner peripheral face of the case 20 and the curved portions 12A of the electrode assembly 12 and support the curved portions 12A with resilience generated by the elastic deformation.

In the specification, the sentence, "the support members 32 (support portions) support the curved portions 12A of the electrode assembly 12" includes a case in which the support members 32 are directly or indirectly in contact with the curved portions 12A of the electrode assembly 12 when the section of the single battery shown in FIG. 3 is observed with a CT scan using X-rays. The sentence, "the support members 32 (support portions) support the curved portions 12A of the electrode assembly 12" includes a case in which the support members 32 are directly or indirectly in contact with the curved portions 12A of the electrode assembly 12 when the sections of the batteries are observed with the CT scan using X-rays in a state in which the plurality of batteries are arranged with the long wall portions 222 being opposed and bound by the restraining member (the state in which the plurality of batteries are pressed in the direction orthogonal to the long wall portions 222 (See FIG. 10)).

It is preferable that the support members 32 are elastically deformed due to contact between the support members 32 and the curved portions 12A. In this way, by utilizing the resilience due to the elastic deformation of the support members 32, it is possible to support the curved portions 12A.

The current collectors 14 are disposed along the electrode assembly 12 in the case 20 and provide conductivity between the protruding parts 126 of the electrode assembly 12 and the terminal portions 16. The battery 10 in the embodiment includes the current collector 14 for the positive electrode and the current collector for the negative electrode. The current collector 14 for the positive electrode provides conductivity between the protruding part 126 on the positive electrode side and the terminal portion 16 for the positive electrode. The current collector 14 for the negative electrode provides conductivity between the protruding part 126 on the negative electrode side and the terminal portion 16 for the negative electrode. In the embodiment, the current collector 14 for the positive electrode is made of aluminum, an aluminum alloy, or the like, for example. The current collector 14 for the negative electrode is made of copper, a copper alloy, or the like, for example.

Each of the current collectors 14 has a terminal-side connection portion 140 to be directly or indirectly connected to the terminal portion 16 and an electrode assembly-side connection portion 141 to be directly or indirectly connected to the protruding part 126 of the electrode assembly 12. The current collector 14 is formed into a shape (substantially L shape) bent at a boundary portion between the terminal-side connection portion 140 and the electrode assembly-side connection portion 141 to conform to the electrode assembly 12 in a front view by bending a plate-shaped metal material cut into a predetermined shape.

Each of the terminal portions 16 is mounted to the lid assembly 24 while passing through the terminal through hole 240 in the lid assembly 24. Specifically, the terminal portion 16 has an external terminal 160, a rivet 161, and a conductive portion 162. The external terminal 160 extends upward outside the case 20. The rivet 161 passes through the terminal through hole 240 in the lid assembly 24 to fix the current collector 14 (the terminal-side connection portion 140) and the conductive portion 162 to the lid assembly 24 while providing conductivity between the current collector 14 and the conductive portion 162. The conductive portion 162 connects the external terminal 160 to the current collector 14 to be able to provide conductivity between the external terminal 160 and the current collector 14 via the rivet 161.

In the battery 10 formed as described above, in the case 20, the straight portion 12B is supported (or pressed) toward inside in the layered direction of the electrodes (the positive electrode 120 and the negative electrode 122) by the convex parts 225, and also the curved portions 12A are supported toward inside in the layered direction of the electrodes 120 and 122 by the support members 32. Therefore, it is possible to suitably suppress gathering of displacement of the electrodes 120 and 122 in the curved portions 12A, the gathering caused by repetition of expansion and contraction of the electrode assembly 12 during charge-discharge. In this way, it is possible to prevent forming of partial clearances between the electrodes 120 and 122 layered at the curved portions 12A of the electrode assembly 12. Each of the protruding part 126 on the positive electrode side and the protruding part 126 on the negative electrode side that are connected to the current collectors 14 is not pressed by the convex parts 225, because the protruding parts 126 have smaller thicknesses than the straight portion 12B of the electrode assembly 12 pressed by the convex parts 225.

The battery 10 in the embodiment has the structure for supporting the curved portions 12A of the electrode assembly 12 by utilizing the resilience generated by the elastic deformation of the support members 32. Therefore, even if the electrode assembly 12 expands and contracts due to the charge-discharge or the like, i.e., the electrode assembly 12 changes in size (winding diameter), the support members 32 follow the change in size and can suitably continue to support the curved portions 12A.

Because the lengths in the X-axis direction of the support members 32 in the embodiment are substantially the same as the length in the X-axis direction of the electrode assembly 12, substantially the entire curved portions 12A in the X-axis direction are supported by the support members 32. Therefore, substantially throughout the X-axis direction of the curved portions 12A, it is possible to prevent forming of the partial clearances between the layered electrodes 120 and 122.

An electric storage device and an electric storage apparatus are not limited to those in the above-described embodiment but can be changed in various ways without departing from the gist of the invention.

Specific structures of the support portions (support members) 32 are not limited. Although the support members 32 in the embodiment are separate from the insulating member 30, the case 20, and the like, the support portions may be formed as parts of the insulating member 30, parts of the case 20, or the like.

Figure 4:
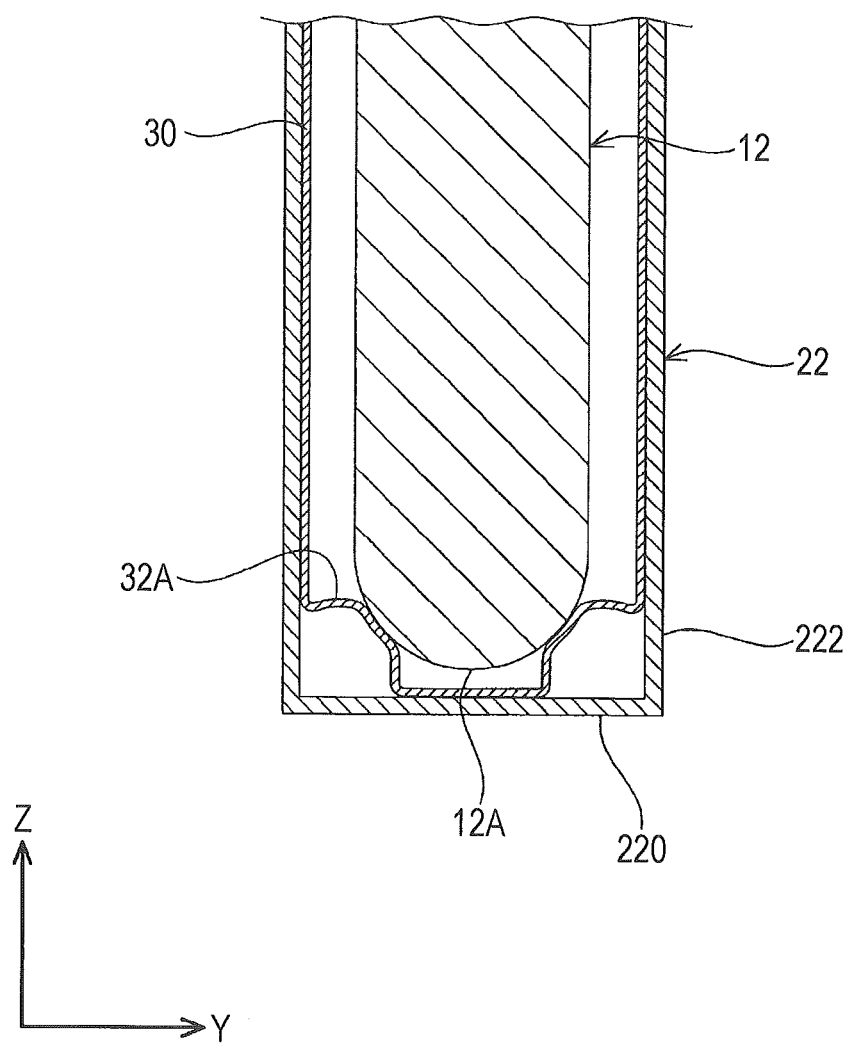
FIG. 4 is a schematic block diagram explaining a structure in which support portions are formed by using parts of an insulating member.

For example, as show in FIG. 4, as support portions 32A, an insulating member 30 may be curved to bulge toward curved portions 12A, and curved portions of the insulating member 30 may support the curved portions 12A in corner portions in the case 20. Alternatively, as support portions, corner portions of the case 20 may bulge inward similarly to the insulating member 30 shown in FIG. 4 and parts of the bulging case 20 may support the curved portions 12A.

In this structure, the support portions 32A are formed by using the parts of the case 20 or the insulating member 30 and therefore, it is possible to reduce the number of parts forming the battery 10 as compared with a case in which the members forming the support portions are disposed separately.

Although the support members (support portions) 32 in the embodiment support the curved portions 12A by using the resilience generated by the elastic deformation, the invention is not limited to it. Support portions (support members) may be formed by members such as rigid bodies which are not elastically deformed or which are hardly elastically deformed as in the above case in which the support portions are formed by using the parts of the case 20, for example. Even with such hard support portions (support members), it is possible to prevent forming of the partial clearances between the layered electrodes 120 and 122 in the curved portions 12A, if the curved portions 12A are supported toward the inside of the electrode assembly 12.

Although the support members 32 are respectively disposed in the four corner portions in the case 20 in the battery 10 in the above embodiment, the invention is not limited to it. The support portions (support members) may be disposed only either in the opposite corner portions on a side of the bottom wall portion 220 or the opposite corner portions on a side of the lid assembly 24. With this structure, it is possible to prevent forming of the partial clearances between the layered electrodes 120 and 122 in the curved portion 12A at least on one side in the major axis direction (Z-axis direction). In this way, as compared with the structure in which only the straight portion 12B of the electrode assembly 12 is supported toward the inside in the layered direction of the electrodes 120 and 122, intervals between the electrodes 120 and 122 forming the electrode assembly 12 become narrow, which increases the charge-discharge efficiency.

Figure 5:
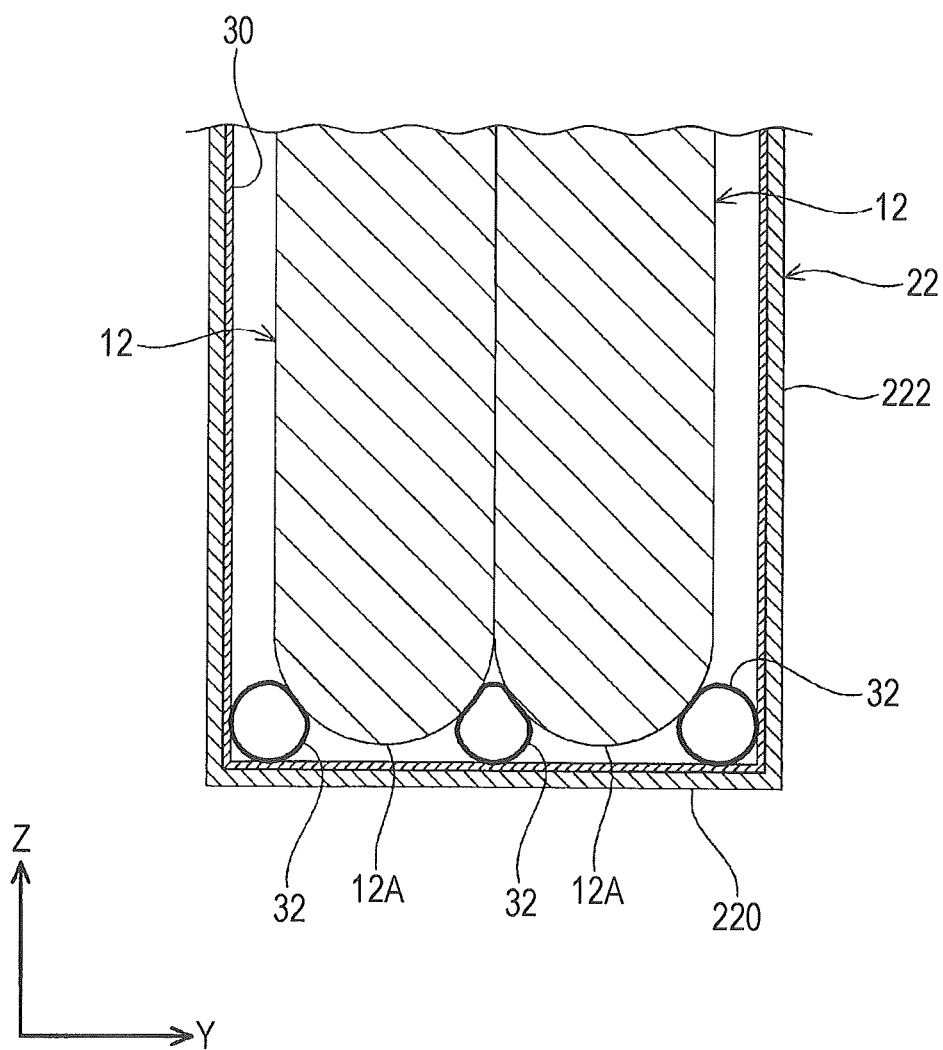
FIG. 5 is a schematic block diagram explaining an arrangement of support portions in a case housing two electrode assemblies.

Moreover, the number of electrode assemblies 12 housed in the case 20 is not limited. Although the one electrode assembly 12 is housed in the case 20 in the above embodiment, two electrode assemblies 12, 12 may be housed in one case 20A, for example, as shown in FIG. 5. Alternatively, three or more electrode assemblies 12, 12, . . . may be housed in one case. In this case, support members (support portions) 32 are preferably disposed at positions between the curved portions 12A, 12A in a Y-axis direction in addition to corner portions as shown in FIG. 5.

Although the insulating member 30 in the above embodiment is formed by folding the sheet-shaped member having insulation property into the bag shape, i.e., the insulating member 30 in the above embodiment can be returned into the sheet shape when unfolded, the invention is not limited to it. The insulating member 30 may be formed into a bag shape (i.e., formed into the bag shape by gluing, welding, or the like).

Although the support members (support portions) 32 in the embodiment have substantially the same lengths as the length of the electrode assembly 12 in the X-axis direction, the invention is not limited to this structure. The support members may have greater lengths than the length of the electrode assembly 12 in the X-axis direction.

Figure 6:
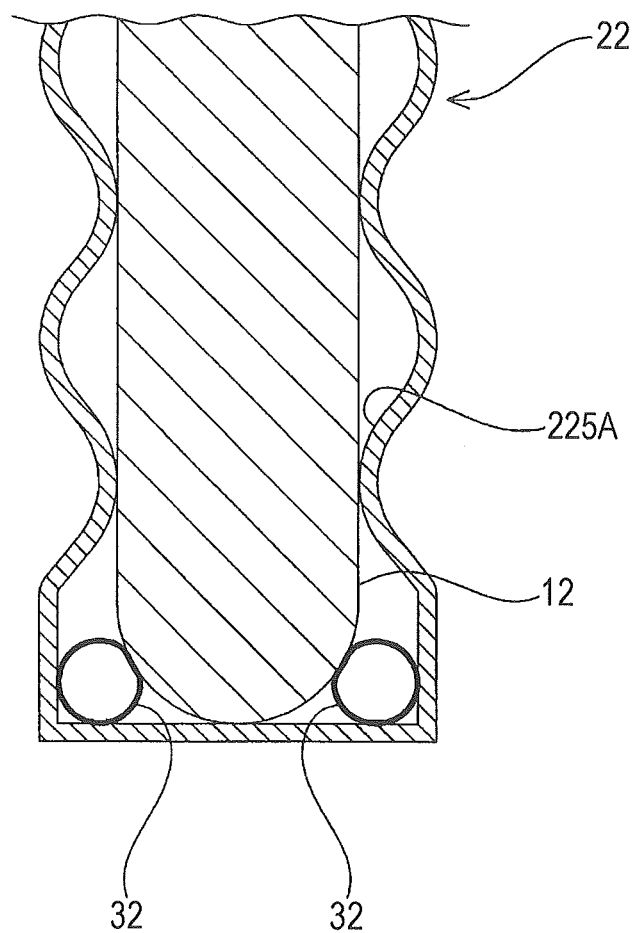
FIG. 6 is a drawing explaining convex parts of a case according to another embodiment.
Figure 7:
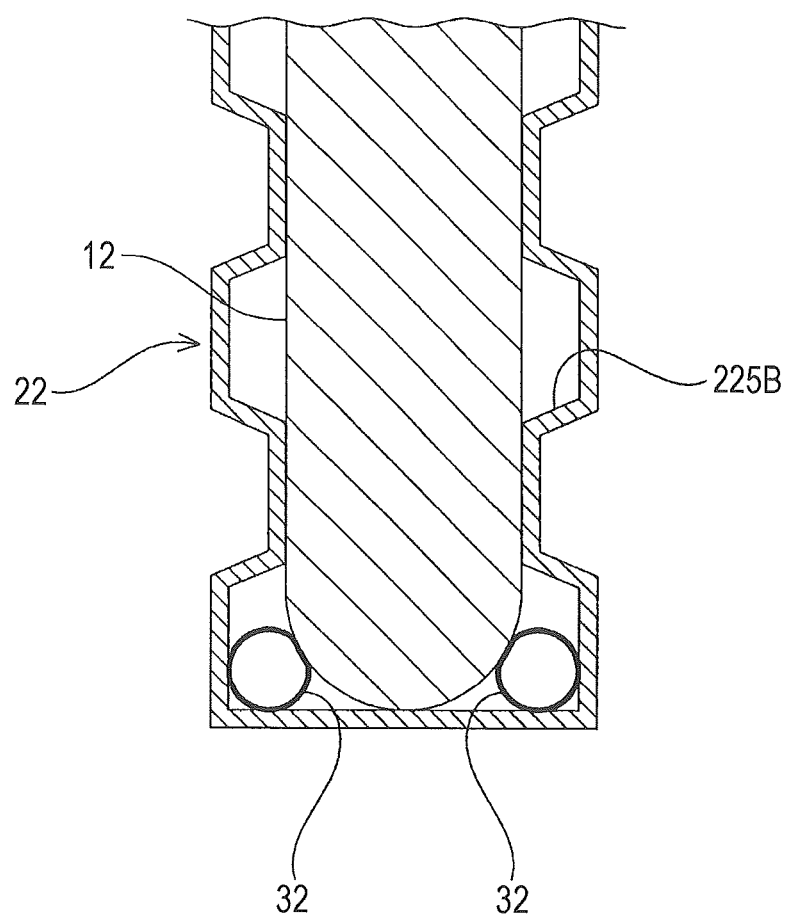
FIG. 7 is a drawing explaining convex parts of a case according to another embodiment.
Figure 8:
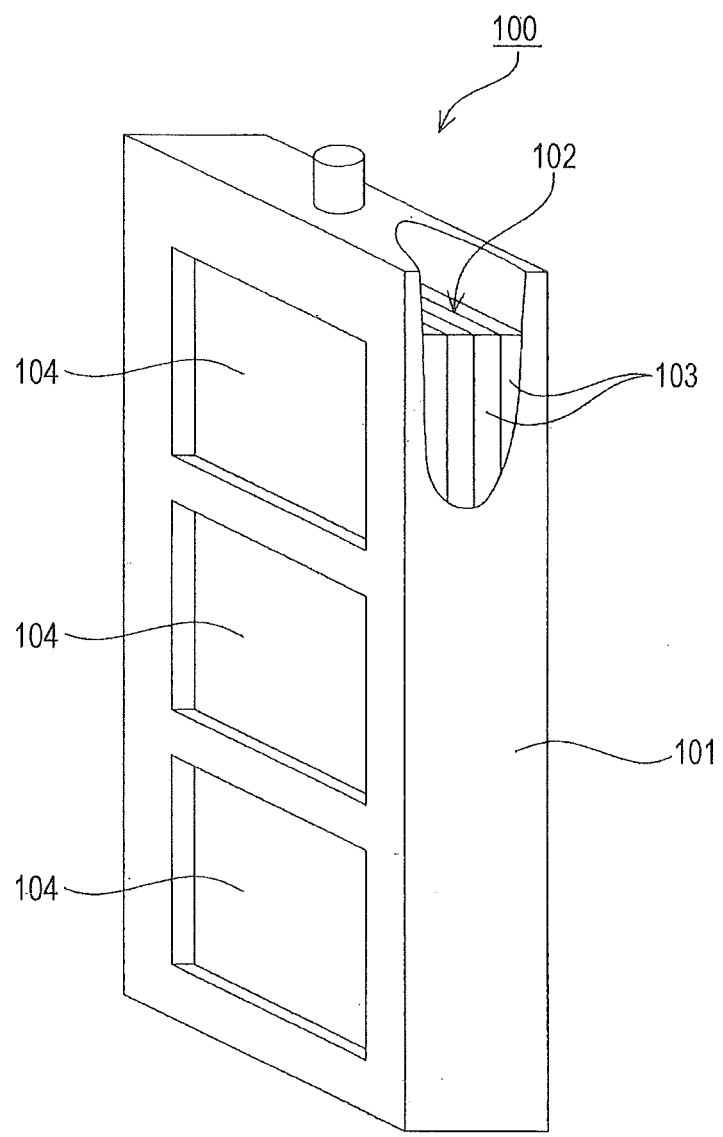
FIG. 8 is a partial cutaway perspective view of a prior-art electric storage device.

Although the convex parts 225 in the above embodiment continuously extend in the X-axis direction, the invention is not limited to it. The convex parts may extend intermittently in the Z-axis direction. Although the plurality of convex parts 225, 225, . . . are continuously arranged in the Z-axis direction on each of the long wall portions 222, the invention is not limited to this structure. On each of the long wall portions 222, the plurality of convex parts 225, 225, . . . may be arranged at intervals in the Z-axis direction. Sectional shapes of the convex parts 225 along the Y-axis direction and the Z-axis direction are not limited to the triangular angle shapes. For example, as shown in FIG. 6, convex parts 225A may be formed to have arc-shaped sections. As shown in FIG. 7, convex parts 225B may be formed to have portions (tip end portions in a protruding direction) which come in contact with an electrode assembly 12 and are flat faces along the straight portion 12B of the electrode assembly 12. Convex parts 225 may be formed by partially increasing thicknesses of long wall portions 222. Although the insulating member 30 is not shown in FIG. 6 and FIG. 7, the insulating member 30 is disposed between the case 20, and the electrode assembly 12 and the support members 32 in the actual battery 10. Although the plurality of convex parts 225, 225, . . . extend to boundaries between the long wall portions 222 and the short wall portions 223 on each of the long wall portions 222, the invention is not limited to this structure. For example, a plurality of convex parts 225, 225, . . . may be formed only at positions near a center in an X-axis direction of each long wall portion 222.

Although the secondary battery (lithium ion secondary battery) which can be charged and discharged has been described in the above embodiment, the battery may be of any type and size (capacity). Although the lithium-ion secondary battery has been described as an example of the electric storage device in the above embodiment, the invention is not limited to it. For example, the invention can be applied to various secondary batteries, a primary battery, and an electric storage device of a capacitor such as an electric double layer capacitor.

What is claimed is:

1. An electric storage device, comprising:
   an electrode assembly in which electrodes are wound such that paired curved portions and a straight portion connecting the paired curved portions are formed;
   a case which houses the electrode assembly, the case comprising a convex part only protruding toward the straight portion of the electrode assembly to support the straight portion;
   a support portion which is in contact with the curved portion and supports the curved portion toward an inside of the electrode assembly; and
   an insulating member disposed between the case and the electrode assembly to insulate the case from the electrode assembly,
   wherein the support member is detachably attached to the insulating member, and
   wherein the support member is configured to be elastically deformed due to contact between the support member and the curved portion.

2. The electric storage device according to claim 1, wherein the support portion supports at least one of the paired curved portions of the electrode assembly.

3. The electric storage device according to claim 1, wherein the case has a substantially rectangular frame-shaped section and houses the electrode assembly such that a side of the substantially rectangular frame-shaped section extends along the straight portion, and
   wherein the support portion is disposed in a corner portion of the substantially rectangular frame-shaped section in the case.

4. The electric storage device according to claim 1, wherein the support portion is a part of the insulating member.

5. The electric storage device according to claim 4, wherein the insulating member includes a portion curved to bulge toward the electrode assembly, and the curved portion of the insulating member supports the curved portion of the electrode assembly.

6. The electric storage device according to claim 1, wherein a dimension of the support portion in a direction orthogonal to a winding direction of the electrodes is substantially equal to or greater than a dimension of the electrode assembly in the direction orthogonal to the winding direction.

7. The electric storage device according to claim 1, wherein the convex part of the case comprises a plurality of convex parts.

8. The electric storage device according to claim 1, wherein the case comprises a wall portion having a wave-shaped inner surface and a wave-shaped outer surface and having a substantially constant thickness, and
   wherein the wave-shaped inner surface forms a plurality of the convex parts, and the plurality of convex parts support the straight portion of the electrode assembly at intervals.

9. The electric storage device according to claim 8, wherein the case comprises a substantially rectangular bottom wall portion when viewed in a direction of a normal,
   wherein the wall portion comprises paired wall portions extending substantially vertically from paired long sides of the bottom wall portion, and
   wherein a maximum clearance between the paired wall portions is greater than a dimension in a short-side direction of the bottom wall portion.

10. An electric storage apparatus comprising the electric storage device according to claim 1 and a restraining member.

11. The electric storage device according to claim 1, wherein the convex part is in contact with the straight portion.

12. The electric storage device according to claim 11, wherein the convex part is in contact with the straight portion via the insulating member disposed between the case and the electrode assembly.

13. The electric storage device according to claim 1, wherein the insulating member abuts the convex part and the straight portion.

14. The electric storage device according to claim 1, wherein the support portion abuts the curved portion.

* * * * *